April 7, 1942. A. FEUCHT Re. 22,059
FEEDING MECHANISM FOR ROCK DRILLS
Original Filed Oct. 15, 1937 2 Sheets-Sheet 1
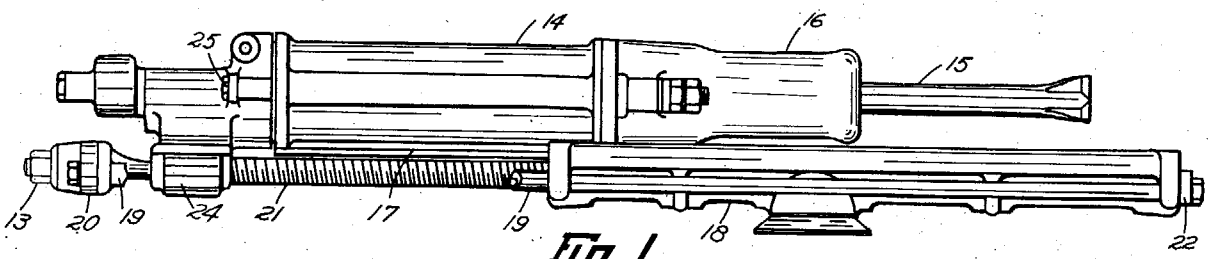
Fig. 1
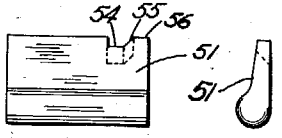
Fig. 3
Fig. 4
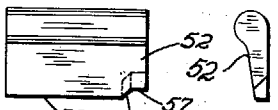
Fig. 11
Fig. 12
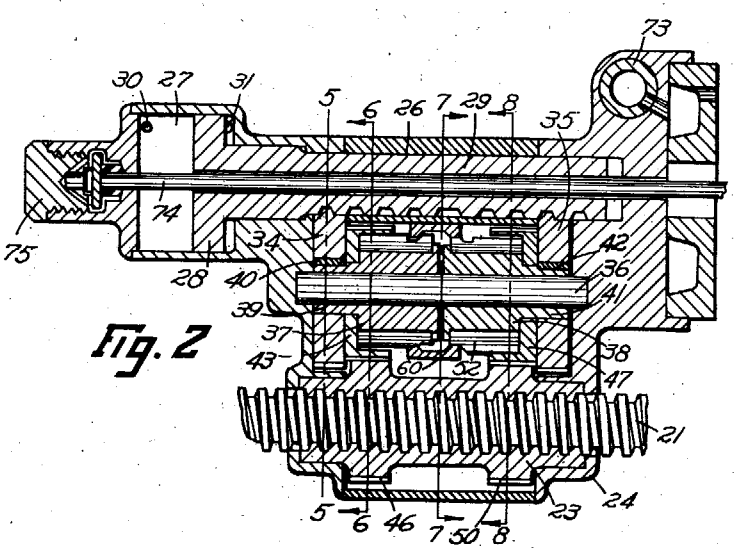
Fig. 2
ALBERT FEUCHT
INVENTOR
BY John V. Rempe
ATTORNEY April 7, 1942. A. FEUCHT Re. 22,059

FEEDING MECHANISM FOR ROCK DRILLS

Original Filed Oct. 15, 1937 2 Sheets-Sheet 2

ALBERT FEUCHT
INVENTOR

BY John C. Rieser
ATTORNEY

Reissued Apr. 7, 1942

Re. 22,059

UNITED STATES PATENT OFFICE 22,059

FEEDING MECHANISM FOR ROCK DRILLS

Albert Feucht, Garfield Heights, Ohio, assignor to The Cleveland Rock Drill Company, Cleveland, Ohio, a corporation of Ohio Original No. 2,207,792, dated July 16, 1940, Serial No. 169,221, October 15, 1937. Application for reissue November 24, 1941, Serial No. 420,276

13 Claims. (Cl. 121—9)

This invention relates broadly to rock drills, but more particularly to a mechanism for automatically feeding the rock drill toward and from the work.

One object of this invention, is to produce a rock drill with a reversible power actuated feeding mechanism operable independently of the rock drill.

Another object of this invention is to produce a power actuated feeding mechanism including a reciprocatory piston coupled with a feeding element for imparting feeding motion thereto during each stroke of the piston.

Another object of this invention is to produce a feeding mechanism forming a compact and light assembly, which is strong, efficient and comparatively inexpensive to manufacture.

Other objects and advantages more or less ancillary to the foregoing reside in the specific construction and aggroupment of the elements peculiar to this structure, as will become apparent from a more complete examination of this specification.

In the drawings:

Fig. 1 is a side elevational view of a rock drill embodying the invention.

Fig. 2 is an enlarged longitudinal sectional view of the feeding mechanism shown in the left end in Fig. 1.

Fig. 3 represents a side elevational view of a pawl used in the feeding mechanism.

Fig. 4 is an end elevational view of the pawl shown in Fig. 3.

Fig. 11 is a side elevational view of another pawl used in the feeding mechanism.

Fig. 12 is an end elevational view of the pawl shown in Fig. 11.

Figure 7:
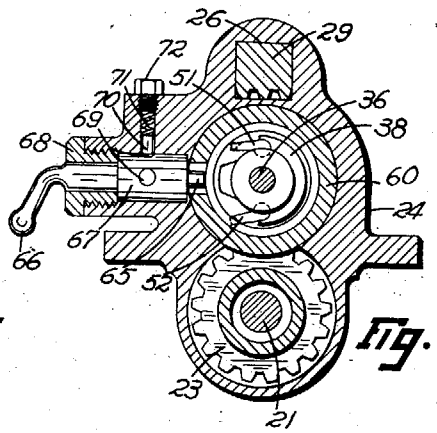
Fig. 7 is a cross sectional view taken through a plane indicated by line 7—7 in Fig. 2.
Figure 10:
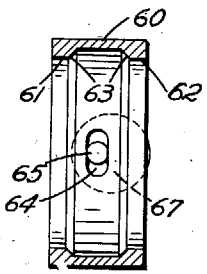
Fig. 10 is an enlarged longitudinal sectional view of the pawls operating sleeve also included in the mechanism.

Referring to the drawings in which like symbols designate corresponding parts throughout the several views, 14 represents a fluid actuated rock drill of the well known drifter type having a hammer (not shown) reciprocable therein for delivering impacts to a drill steel 15 slidably mounted within a front housing 16. This rock drill is provided with the usual guides 17 by which the rock drill is slidably guided on a support or shell 18 for longitudinal slidable movement relative thereto. This support also carries a pair of side bolts 19, one on each side thereof and as shown in Fig. 1 partly cut away to show details of construction. Carried by the left end of the side bolts in Fig. 1, there is a cross plate 20 supporting one end of a stationary screw 21 held against rotation by a nut 13, which screw extends longitudinally of the shell 18 and has its other end carried by a front plate 22 also secured to the shell by the side bolts 19.

Operatively associated with the screw 21, there is a feed nut 23 rotatably mounted within the lower portion of a housing 24 which is rigidly secured to the rock drill 14 by two side rods 25, one mounted on each side of the rock drill. This housing is formed with a bore 26 terminated toward the left in Fig. 2 by a piston chamber 27 disposed coaxially with the center axis of the rock drill or drilling motor 14. Within the chamber 27 is reciprocably mounted a piston member 28 in fluid tight engagement with the inner wall of the chamber and formed with a stem 29 extending into the bore 26 where it is free to slide. Opening into the chamber 27, one on each side of the piston 28, there are two ports 30 and 31 capable of alternatively admitting and exhausting motive fluid into and out of the piston chamber for effecting the reciprocation of the piston 28. These ports are controlled by any suitable valve, numerous types of which are well known in this art, and since the valve itself does not form a part of this invention, but is associated with this mechanism only for controlling the admission and exhaust of the motive fluid into the chamber 27 for actuating the piston 28, no showing of this valve is thought necessary.

Formed on the stem 29, there are two sets of spiral gear teeth 32 and 33 disposed in opposed angular relation, with the teeth 32 engaging a gear 34, and the teeth 33 engaging a gear 35. The teeth of the stem 29, which may now be referred to as a rack, together with the teeth of the gears 34 and 35, are shaped in a manner effecting a partial rotation of the gears in opposite direction upon each stroke of the rack 29. The two gears are rotatably mounted on a shaft 36 located within the casing 24 above the nut 23. Rotatable on the shaft 36 between the gears 34 and 35, there are two pawl carrying heads 37 and 38, the head 37 having a hub 39 extending through the gear 34 where it is secured against relative rotation by a key 40, while the head 35 has a similar hub 41 secured to the gear 35 by a key 42. On the hub 39 is rotatably mounted a ratched ring 43 formed with a skirt extending part way over the head 37 with its inner wall provided with teeth 44, while its external wall is shaped as a gear 45 meshing with a similar gear 46 formed integral with the nut 23. Rotatably mounted on the hub 41 of the head 38, there is a similar ring 47 having a skirt also partly extending over the head 38 and formed internally with teeth 48, and externally with gear teeth 49 meshing with a corresponding gear 50 formed integral with the nut 23. Each head 37 and 38 pivotally carries two pawls 51 and 52 constantly urged into operative engagement with the internal teeth of their respective ring 43 or 47 by spring pressed plungers 53. Near one of its ends, the pawl 51 is formed with a notch 54 having an inclined side wall 55 and a land 56 between the notch and the adjacent end of the pawl, while the pawl 52 is formed with a similar notch 57 having its bottom wall leading from the adjacent end of the pawl and united to the top or end wall 58 of the pawl by an inclined side wall 59. Slidable over the adjacent ends of the heads 37 and 38, there is a pawl operating ring 60 formed with two annular internal end beads 61 and 62 each having an inclined inner side wall 63. This ring is also provided with an elongated slot 64 accommodating the inner end or tip 65 of a handle 66 having a body portion 67 rotatably mounted within the housing 24 and secured therein by a nut 68. The tip 65 is formed eccentrically relative to the center axis of the body portion 67, thereby causing the slidable movement of the ring 60 upon rotation of the handle 66. To maintain this handle in desired positions, the body portion thereof is provided with detents 69 accommodating the end of a spring pressed plunger 70 located within a bore 71 closed by a removable plug 72. The width of the ring 60 is such that when it is in one position its bead 61, relative to the pawls carried by the head 37, is located into the notch 54 of the pawl 51 and in engagement with the end wall 58 of the pawl 52. In this position of the ring, its bead 62 relative to the pawls carried by the head 38 is engaging the land 56 of the pawl 51 and is located into the notch 57 of the pawl 52.

Rotatably mounted within the housing 24, there is a throttle valve 73 for controlling the admission of the motive fluid into the drilling motor 14, while 74 represents a small tube extending through the feeding mechanism above described for admitting cleaning fluid into the drill steel 15. This tube is removably secured to the housing 24 by a plug 75.

Figure 6:
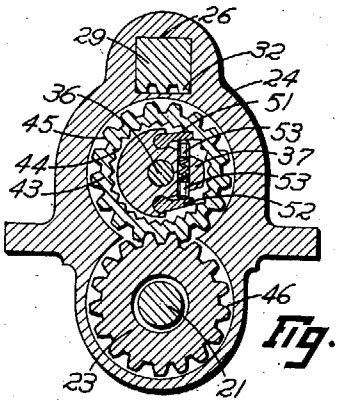
Fig. 6 is a cross sectional view taken through a plane indicated by line 6—6 in Fig. 2.
Figure 9:
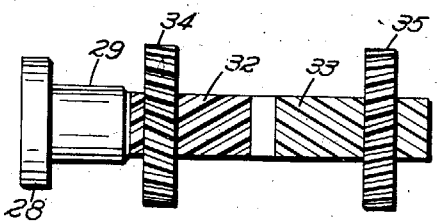
Fig. 9 is a view illustrating the relation of the gears with the piston rack.
Figure 5:
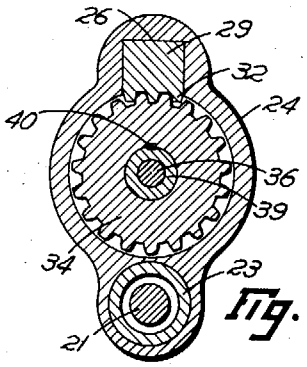
Fig. 5 is a cross sectional view taken through a plane indicated by line 5—5 in Fig. 2.
Figure 8:
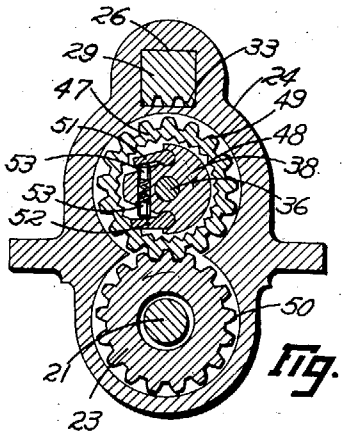
Fig. 8 is a cross sectional view taken through a plane indicated by line 8—8 in Fig. 2.

In the operation of the mechanism, let it be assumed that motive fluid is admitted into the piston chamber 27 alternatively on each side of the piston 28 through ports 30 and 31 for effecting the reciprocatory motion of the piston 28 and the consequential reciprocation of the stem or rack 29, and that the ring 60 is located as shown in Fig. 2. In this instance, the annular bead 61 of the ring 60 is positioned into the notch 54 of the pawl 51 carried by the head 37, allowing the engagement of this pawl with the teeth 44 of the ratchet ring 43 as shown in Fig. 6, while the pawl 52 carried by the same head 37 is maintained out of engagement with the teeth 44 due to the bead 61 engaging the end wall 58 of the pawl. With reference to the pawls carried by the head 38, the annular bead 62 of the ring 60 engaging the land 56 of the pawl 51 will maintain the same out of engagement with the teeth 48 of the ratchet ring 47, while the pawl 52 is engaging the teeth 48 as shown in Fig. 8 due to the location of the bead 62 into the pawl notch 57. During the stroke of the rack 29 in a forward direction or toward the right in Fig. 2, the rack teeth 32 engaging the gear 34 will cause the latter and the head 37 to rotate in a clockwise direction in Fig. 6, while the rack teeth 33 engaging the gear 35 will cause the rotation of the latter and of the head 38 in the opposite direction or counterclockwise direction in Fig. 8. With the head 37 rotating in a clockwise direction in Fig. 6, the pawl 51 engaging one of the ratchet teeth 44 will transmit rotation to the ratchet ring 43, and therefrom to the feed nut 23 due to the operative engagement of the ratchet ring gear teeth 45 with the gear teeth 46 of the nut, thereby causing rearward feeding motion of the drilling motor. In this instance, the pawl 52 carried by the head 38 which is now rotated in a counterclockwise direction in Fig. 8, will simply ride the teeth 48 of the ratchet ring 47 without interfering with the rotation of the latter in a clockwise direction in Fig. 8 transmitted thereto from the feed nut 23.

During the return stroke of the rack 29, the gear 35 and head 38 will be rotated in a clockwise direction in Fig. 8, which rotation is transmitted to the ratchet ring 48 by the pawl 52 carried by the head 38, and from the ratchet ring 48 to the nut 23 due to the operative engagement of the ratchet ring gear teeth 49 with the gear teeth 50 of the nut. In this instance, the rotation of the nut 23 is in the same direction as that resulting from the forward stroke of the rack, thereby again causing the rearward feeding motion of the drilling motor. During the return stroke of the rack, the gear 34 and head 38 are rotated in a counterclockwise direction in Fig. 6, causing the pawl 51 to simply ride the teeth 44 without interfering with the rotation in a clockwise direction transmitted to the ratchet ring 43 from the nut 23.

When it is desired to feed the drilling motor in the other direction or toward the work, the handle 66 may be rotated about 90° to shift the sleeve 60 into a new position wherein its annular bead 61 will engage the land 56 of the pawl 51 carried by the head 37 for preventing the engagement of this pawl with the teeth 44 of the ring 43, while the pawl 52 also carried by the head 37 will be engaging the teeth 44 due to the location of the annular bead 61 into the pawl notch 57. In this new position of the sleeve 60, its annular bead 62 will also engage the end wall 58 of the pawl 52 carried by the head 38 for preventing the engagement of this last pawl with the teeth 48 of the ratchet ring 47, while the pawl 51 carried by the same head 38 is now free to engage the teeth 48 due to the location of the annular bead 62 into the pawl notch 54.

With the pawl 52 engaging the teeth 44 of the ratchet ring 43 and the pawl 51 engaging the teeth 48 of the ratchet ring 47, it will be understood that during the forward stroke of the rack 29, the rotation imparted to the head 37 in a clockwise direction in Fig. 6 will simply cause the pawl 52 carried by the head to ride the teeth 44 of the ratchet ring 43, while the pawl 51 carried by the head 38 which is rotated in a counterclockwise direction in Fig. 8, imparts rotation in that direction to the ratchet ring 47, which rotation is transmitted to the feed nut 23 in a clockwise direction in Fig. 8 for feeding the drilling motor toward the work.

During the rearward stroke of the rack 29, the head 37 now rotated in a counterclockwise direction in Fig. 8, will cause the pawl 52 carried thereby to transmit rotation to the ratchet ring 43 in the same direction, which rotation is transmitted to the feed nut 23 in a clockwise direction for again feeding the drilling motor toward the work. Simultaneously, the head 38 is rotated in a clockwise direction in Fig. 8, causing the pawl 51 to simply ride the teeth 48 without interfering with the rotation of the ring 47 in a counterclockwise direction transmitted thereto from the feed nut 23.

From the foregoing description, it will be understood that the gears 34 and 35 have oscillatory motion in opposite direction relative to each other imparted thereto due to the reciprocatory motion of the rack 29. Through the ratchet mechanism, the rotation of the gears 34 and 35 in the same direction is transmitted to the feed nut 23 for imparting feeding motion to the drilling motor. In other words, rotation or feeding motion is imparted to the feeding element or nut 23 in the same direction upon each stroke of the reciprocatory rack 29, resulting in a substantially constant feeding motion of the drilling motor at a greater rate of speed than that which would result from the strokes of the rack in a single direction. It will also be understood that by simply rotating the handle 66, the direction of feeding motion may be reversed at will without affecting its rate of speed.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a feeding mechanism for a rock drill, a fluid actuated reciprocable member, a feeding element capable of feeding motion in either direction, means associated with said member and element for converting each stroke of said member into a feeding motion of said element, and means for selectively controlling the direction of feeding motion of said element.

2. In a feeding device for a rock drill, a power actuated reciprocable toothed member, a feeding element capable of feeding motion in either direction, a movement transforming mechanism between said member and element including means responsive to each stroke of said member for imparting feeding motion to said element, and means for selectively controlling the direction of feeding motion of said element.

3. In a feeding device for a rock drill, a reciprocatory motor, a feeding element capable of feeding motion in either direction, means operatively associated with said motor and element responsive to each stroke of said motor for imparting feeding motion to said element, and means for selectively controlling the direction of feeding motion of said element.

4. In a drilling apparatus, the combination with a support, of a drilling motor slidable on the support, of a feeding mechanism for the motor including a power actuated reciprocable member, a duality of operatively associated elements one carried by the support and the other by the motor, one of said elements being capable of rotation relative to the other for effecting the feeding motion of the motor in either direction, means operatively associated with said member and the rotatable element and responsive to each stroke of said member for imparting rotation to said rotatable element resulting in the feeding motion of said motor, and means for selectively controlling the direction of said feeding motion.

5. In a drilling apparatus, the combination with a support, of a drilling motor slidable on the support, of a feeding mechanism for the motor including a power actuated reciprocable member, a stationary screw carried by the support in operative engagement with a rotatable nut carried by the motor for effecting feeding motion of the motor upon rotation of the nut, means operatively associated with said member and nut for effecting the rotation of said nut in one direction upon each stroke of said member, and means for selectively controlling the direction of rotation of said nut.

6. In a drilling apparatus, the combination with a support, of a drilling motor slidable back and forth of the support, of a feeding mechanism for said motor including a power actuated member reciprocable relative to the motor, and means for automatically transforming each stroke of said member into a feeding motion in one or the other direction of said drilling motor.

7. In a drilling apparatus, the combination with a support, of a drilling motor slidable on the support, of a feeding mechanism for said motor including a stationary screw carried by the support in operative engagement with a rotatable nut carried by the motor for effecting feeding motion of the motor upon rotation of said nut, a power actuated reciprocable rack, two sets of teeth on said rack disposed in opposite angular relation, a gear for each set of said teeth engageable therewith for oscillatory movement in opposite direction relative to each other upon the reciprocation of said rack, and means for transmitting the rotation of each gear in one direction to said nut for effecting the feeding motion of the drilling motor in one direction.

8. In a drilling apparatus, the combination with a support, of a drilling motor slidable on the support, of a feeding mechanism for said motor including a stationary screw carried by the support in operative engagement with a rotatable nut carried by the motor for effecting feeding motion of the motor upon rotation of said nut in one direction, a duality of power actuated elements movable back and forth in opposite direction relative to each other, and means responsive to the movement of each of said elements in one direction for effecting the aforesaid rotation of said nut.

9. In a drilling apparatus, the combination with a support, of a drilling motor slidable on the support, of a feeding mechanism for said motor including a duality of operatively associated elements one capable of rotation relative to the other for effecting feeding motion of the motor, a duality of power actuated members rotatable back and forth in opposite direction relative to each other, and means for transmitting the rotation of said members in one direction to the rotatable element for effecting the feeding motion of the motor.

10. In a drilling apparatus, the combination with a support, of a drilling motor slidable on the support, of a feeding mechanism for said motor including a duality of operatively associated elements one capable of rotation relative to the other for effecting feeding motion of the motor, a duality of power actuated members alternatively rotated in one and the same direction, and means for transmitting the rotation of said members in said one and the same direction to the rotatable element.

11. The combination with a drilling motor having a hammer reciprocable therein, of feeding means for said motor including a housing, a fluid actuated piston reciprocable within said housing, a duality of elements one deriving rotation in one direction from the working stroke of said piston and the other deriving rotation in the same direction from the return stroke of said piston, and means responsive to the aforesaid rotation of said elements for effecting feeding motion of the motor in one direction.

12. The combination with a drilling motor having a hammer reciprocable therein, of feeding means for said motor including a housing, a fluid actuated member movable back and forth within said housing, means deriving motion from the movement of said member in both directions for transmitting feeding motion to said motor, and means for selectively controlling the direction of said feeding motion.

13. The combination with a drilling motor having a hammer reciprocable therein, of feeding means for said motor including a housing, a duality of fluid actuated elements within said housing alternatively rotatable in one direction, and means deriving motion from the aforesaid rotation of said elements for transmitting feeding motion to said motor.

ALBERT FEUCHT.